(12) United States Patent
Edwards et al.

(10) Patent No.: US 10,872,335 B1
(45) Date of Patent: Dec. 22, 2020

(54) ONLINE TRANSACTION VERIFICATION BASED ON MERCHANT-INDEPENDENT USER GEOLOCATION (71) Applicant: Capital One Services, LLC, McLean, VA (US)

(72) Inventors: Joshua Edwards, McLean, VA (US); Michael Mossoba, McLean, VA (US); Abdelkader Benkreira, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/729,820

(22) Filed: Dec. 30, 2019

(51) Int. Cl.
*G06Q 20/40* (2012.01)
*G06Q 10/08* (2012.01)
*G06Q 20/38* (2012.01)

(52) U.S. Cl.
CPC ....... *G06Q 20/401* (2013.01); *G06Q 10/0835* (2013.01); *G06Q 20/382* (2013.01)

(58) Field of Classification Search
USPC ....................................................... 705/3–44
See application file for complete search history.

(56) References Cited

U.S. PATENT DOCUMENTS

| | | | | |
|---|---|---|---|---|
| 7,542,931 B2 * | 6/2009 | Black | ..................... | G06Q 20/02 238/57 |
| 8,142,639 B2 * | 3/2012 | Orihashi | .................. | C25D 3/62 205/250 |
| 8,566,197 B2 * | 10/2013 | Satyavolu | ........... | H04M 15/805 705/35 |
| 8,639,600 B2 * | 1/2014 | Lee | ........................ | G06Q 20/40 705/35 |
| 9,911,155 B1 * | 3/2018 | Gupta | ..................... | G06Q 40/00 |
| 2009/0119194 A1 * | 5/2009 | Chau | ..................... | G06Q 20/385 705/35 |
| 2009/0164324 A1 * | 6/2009 | Bishop | ................. | G06Q 20/204 705/17 |

(Continued)

OTHER PUBLICATIONS

Dalton, Patrick, "Electronic Marketing", ABA Bankers News; Washington, vol. 9., Iss. 22 Oct. 30. (Year: 2001).*

*Primary Examiner* — Frantzy Poinvil
(74) *Attorney, Agent, or Firm* — Pillsbury Winthrop Shaw Pittman LLP (57) ABSTRACT

In certain embodiments, an online transaction is verified based on merchant-independent user geolocation. A geolocation of a user associated with the online transaction is obtained from a mobile device of the user by a transaction verifying entity separate and independent from a merchant entity with which the online transaction is initiated. A server associated with the transaction verifying entity determines a proximity of the geolocation of the user to a delivery address for verifying the online transaction. The server generates a verification message including an approval message based on the proximity of the geolocation to the delivery address being within a specified threshold. The server generates a verification message including a rejection message based on the proximity of the geolocation to a delivery address exceeding the specified threshold. The server sends the verification message to another server associated with the merchant entity to carry out the online transaction accordingly.

20 Claims, 6 Drawing Sheets

(56) References Cited

U.S. PATENT DOCUMENTS

| | | | | |
|---|---|---|---|---|
| 2012/0179531 | A1* | 7/2012 | Kim | G06O 30/0601 |
| | | | | 705/14.26 |
| 2013/0046635 | A1* | 2/2013 | Grigg | G06Q 30/0238 |
| | | | | 705/14.58 |
| 2013/0117155 | A1* | 5/2013 | Glasgo | G06Q 30/00 |
| | | | | 705/26.35 |
| 2014/0108124 | A1* | 4/2014 | Bous | G06Q 30/0238 |
| | | | | 705/14.38 |
| 2014/0172739 | A1* | 6/2014 | Anderson | G06Q 10/08355 |
| | | | | 705/338 |
| 2014/0195456 | A1* | 7/2014 | Horstemeyer | H04L 63/08 |
| | | | | 705/333 |
| 2014/0337232 | A1* | 11/2014 | Glasgo | G06Q 20/401 |
| | | | | 705/44 |
| 2015/0149226 | A1* | 5/2015 | Horstemeyer | G06Q 30/0241 |
| | | | | 705/7.13 |
| 2015/0186869 | A1* | 7/2015 | Winters | G06Q 10/0834 |
| | | | | 705/26.81 |
| 2015/0220999 | A1* | 8/2015 | Thornton | H04M 15/8011 |
| | | | | 705/14.66 |

* cited by examiner

ONLINE TRANSACTION VERIFICATION BASED ON MERCHANT-INDEPENDENT USER GEOLOCATION

TECHNICAL FIELD

The disclosed embodiments relate to transaction verification, including, for example, verifying an online transaction based on merchant-independent user geolocation.

BACKGROUND

E-commerce systems employ various security mechanisms to identify and avoid unauthorized transactions (e.g., online transactions in which a user placing the order using payment information of another user). For example, an online merchant can limit delivery of goods to the billing address associated with the payment method by ensuring that the delivery address and the billing address are the same. However, such a method is restrictive as it prevents a user from having goods delivered to an address other than the billing address associated with the payment method. In another example, where a user uses the merchant's application to place an order, the merchant can rely on geolocation information derived from the merchant application to ensure that the order is delivered to the user by verifying that the geolocation information matches the delivery address. However, the use of the merchant application's geolocation information simply confirms that the user placing the order is near the delivery address—it does not sufficiently protect the merchant from users who use the payment information of others without authorization. These and other drawbacks exist.

SUMMARY

Aspects of the disclosed embodiments relate to methods, apparatuses, and/or systems for facilitating verification of a transaction based on merchant-independent user geolocation.

In some embodiments, a system obtains merchant-independent user geolocation of a user associated with an online transaction initiated at a merchant computer system (e.g., a "merchant server"), verifies the online transaction based on the user geolocation, and sends a verification message to the merchant server for approving or rejecting the online transaction. As an example, when a user initiates an online transaction at a merchant server associated with a merchant entity, the merchant server requests a transaction verification computer system (e.g., a "transaction verification server") to verify the online transaction. The transaction verification server is (a) associated with a transaction verifying entity different from the merchant entity, and (b) separate and independent from the merchant server. The transaction verification server obtains a geolocation of the user from a mobile application associated with the transaction verifying entity installed on a mobile device of the user. In some embodiments, geolocation is the identification or estimation of the real-world geographic location of an object, such as a radar source, mobile phone, or Internet-connected computer terminal. The transaction verification server verifies the online transaction based on a proximity of the geolocation to a delivery address specified in the online transaction, and sends a verification message to merchant server. In one embodiment, the verification message includes an approval message based on the proximity of the geolocation to a delivery address being within a specified threshold. In another embodiment, the verification message includes a rejection message based on the proximity of the geolocation to a delivery address exceeding the specified threshold.

As another example, the transaction verification server may verify the online transaction based on a rate of motion of the user and a proximity of the geolocation of the user to the delivery address at a delivery time. The transaction verification server may periodically perform a pull request to obtain a plurality of geolocations of the user from the mobile application on the mobile device, determine the rate of motion of the user, determine whether the user would be within a specified proximity of the delivery address at the delivery time based on the rate of motion, and send a verification message to the merchant server accordingly. In one embodiment, the verification message includes an approval message based on the rate of the motion indicating the proximity of the geolocation of the user to the delivery address will be within a specified threshold near a delivery time. In another embodiment, the verification message includes a rejection message based on the rate of the motion indicating the proximity of the geolocation of the user to the delivery address will not be within the specified threshold near the delivery time.

The merchant server may receive the verification message from the transaction verification server and perform the transaction based on the verification message. For example, if the verification message includes an approval message, the merchant server may complete the transaction to have the goods delivered at the delivery address. In another example, if the verification message includes a rejection message, the merchant server may cancel the transaction to keep the goods from being delivered to the delivery address.

Various other aspects, features, and advantages of the invention will be apparent through the detailed description and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
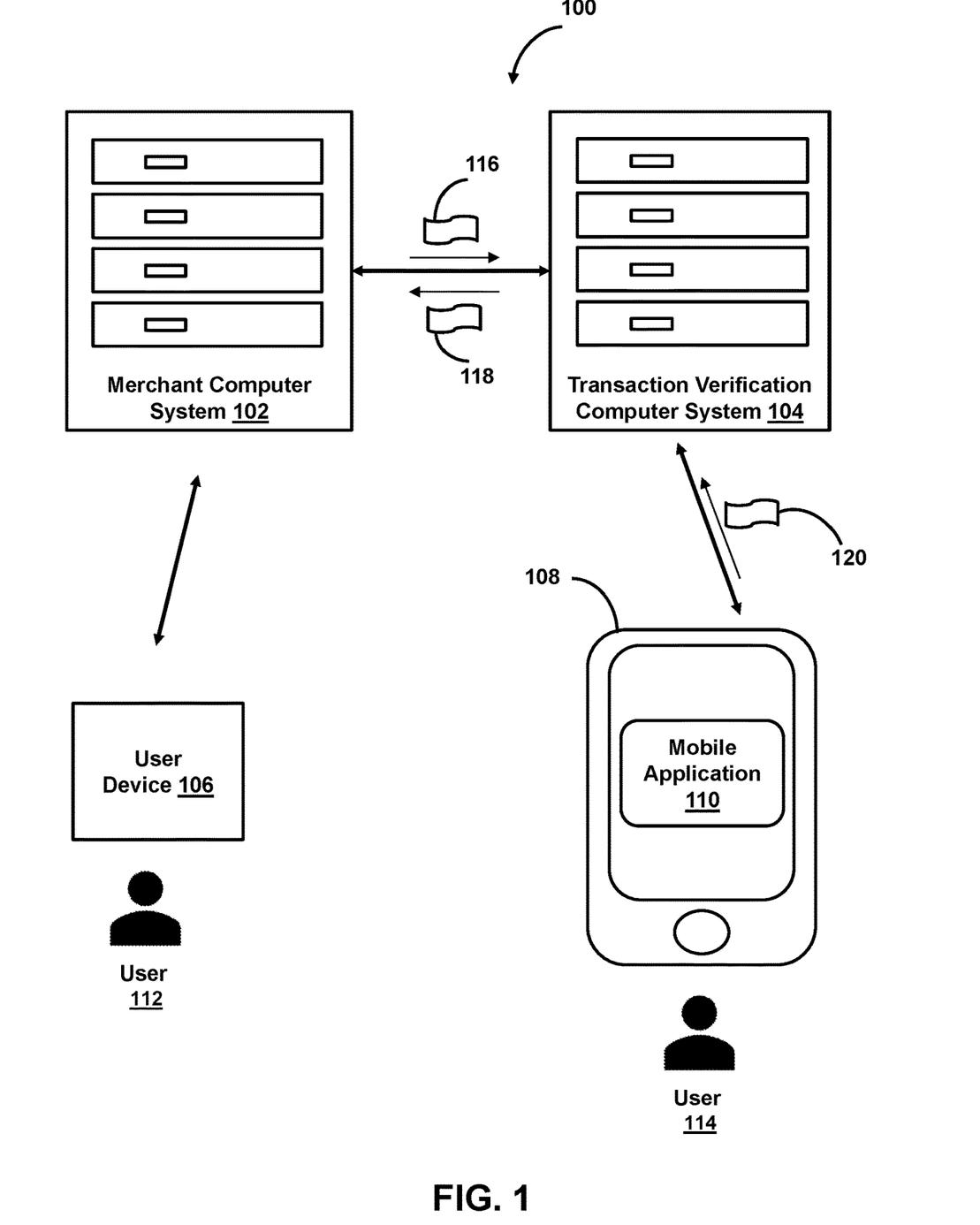
FIG. 1 shows a system for facilitating transaction verification using a merchant-independent geolocation of a user, in accordance with one or more embodiments.

FIG. 1 shows a system 100 for facilitating verification of an online transaction using a merchant-independent geolocation of a user, in accordance with one or more embodiments. As shown in FIG. 1, system 100 may include merchant computer system 102 (e.g., one or more merchant servers), transaction verification computer system 104 (e.g., one or more transaction verification servers), user device 106, mobile device 108, or other components. The merchant computer system 102 and the transaction verification computer system 104 may include any type of mobile terminal, fixed terminal, or other device. By the way of example, merchant computer system 102 and the transaction verification computer system 104 may include any computing device, such as a personal computer (PC), a laptop computer, a tablet computer, a hand-held computer, other computer equipment. The user device 106 may include any type of mobile terminal, fixed terminal, or other device. By way of example, user device 106 may include a PC, a laptop computer, a tablet computer, other computer equipment, including "smart," wireless, wearable, and/or mobile devices. While shown as smartphone in FIG. 1, it should be noted that mobile device 108 may be any mobile computing device, including a laptop computer, a tablet computer, a hand-held computer, other computer equipment (e.g., a server), including "smart," wireless, wearable, and/or mobile devices.

A component of system 100 may communicate with one or more components of system 100 via a communication network (e.g., Internet, a mobile phone network, a mobile voice or data network, a cable network, a public switched telephone network, or other types of communications network or combinations of communications networks). The communication network may be a wireless or wired network. As an example, the user device 106 may interact with the merchant computer system 102 via the above described communication network. As another example, the mobile device 108 and the transaction verification computer system 104 may communicate wirelessly.

It should be noted that, while one or more operations are described herein as being performed by particular components of system 100, those operations may, in some embodiments, be performed by other components of system 100. As an example, while one or more operations are described herein as being performed by components of transaction verification computer system 104, those operations may, in some embodiments, be performed by components of merchant computer system 102.

In some embodiments, system 100 facilitates verification of a transaction (e.g., an online transaction or other transaction) using geolocation 120 of user 114 associated with the transaction. For example, a transaction for purchasing goods may be initiated at merchant computer system 102 associated with a merchant entity. User 112 may use user device 106 for initiating the transaction at merchant server. As an example, user 112 may use a mobile application associated with merchant entity in user device 106 for initiating the transaction. As another example, user 112 may access a website associated with the merchant entity for initiating the transaction. User 112 may provide information such as name of user, telephone number, email ID, delivery address, delivery time, payment information, or other information as part of the transaction. In some embodiments, the payment information may include credit card information, debit card information, bank account information, or other types of payment information associated with user 114. It should be noted that user 112, who initiates the transaction, and user 114 associated with the payment information may be the same user or different users.

The merchant computer system 102 may have another entity independent and separate from the merchant entity verify the transaction prior to completing the transaction. As an example, merchant computer system 102 may determine a transaction verifying entity, such as a bank or other financial institution, to perform the verification of the transaction. In some embodiments, merchant computer system 102 may determine the transaction verifying entity based on the payment information provided in the transaction. The merchant computer system 102 sends verification request 116 to transaction verification computer system 104 associated with the transaction verifying entity. The verification request 116 may include transaction data such as payment information, delivery address, delivery time, user telephone number, user email ID, or other information.

In response to receiving verification request 116, transaction verification computer system 104 obtains geolocation 120 of user 114 from mobile device 108 associated with user 114. In some embodiments, geolocation is the identification or estimation of the real-world geographic location of an object, such as a radar source, mobile phone (e.g., mobile device 108), or Internet-connected computer terminal. In some embodiments, transaction verification computer system 104 obtains geolocation 120 from mobile application 110 installed in mobile device 108. As an example, mobile application 110 from which geolocation 120 is obtained may be different and independent of mobile application that may be used to initiate the transaction with merchant computer system 102. The mobile application 110 may be associated with the transaction verifying entity. As an example, mobile application 110 may be an "app" associated with a bank (e.g., bank provided in the payment information). In some embodiments, mobile application 110 may require user 114 to be a registered user with the transaction verifying entity (e.g., user 114 may be required to sign up with mobile application 110 to have a user profile created in the mobile application 110). In some embodiments, transaction verification computer system 104 may obtain the geolocation using a sensor (e.g., global positioning system (GPS)) of mobile device 108. Further, user 114 may have to configure mobile application 110 to share location data with one or more entities (e.g., transaction verification computer system 104) for transaction verification computer system 104 to obtain the geolocation 120.

Figure 2A:
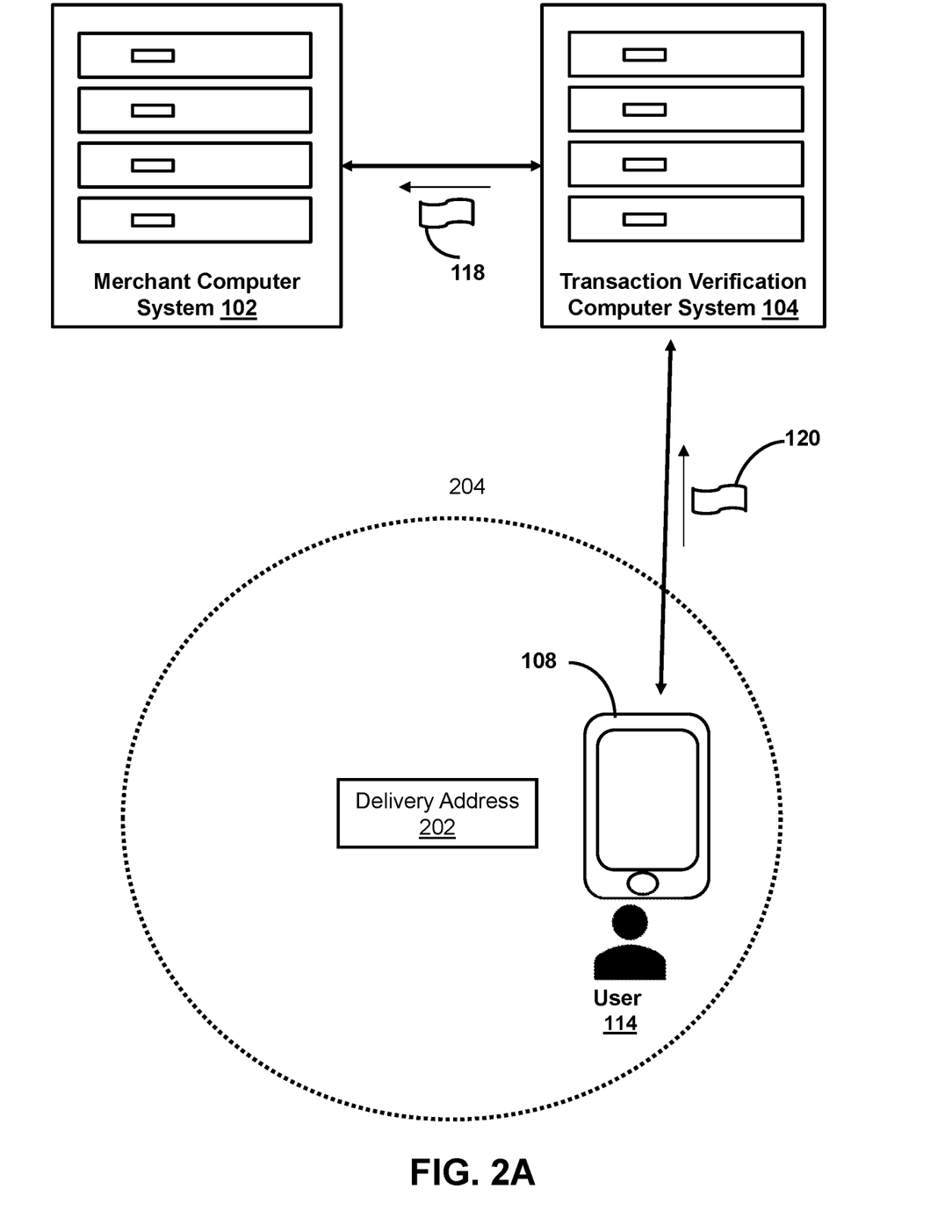
FIG. 2A shows a system configured to send a verification message indicating a transaction approval based on proximity of a geolocation of a user to a delivery address, in accordance with one or more embodiments.
Figure 2B:
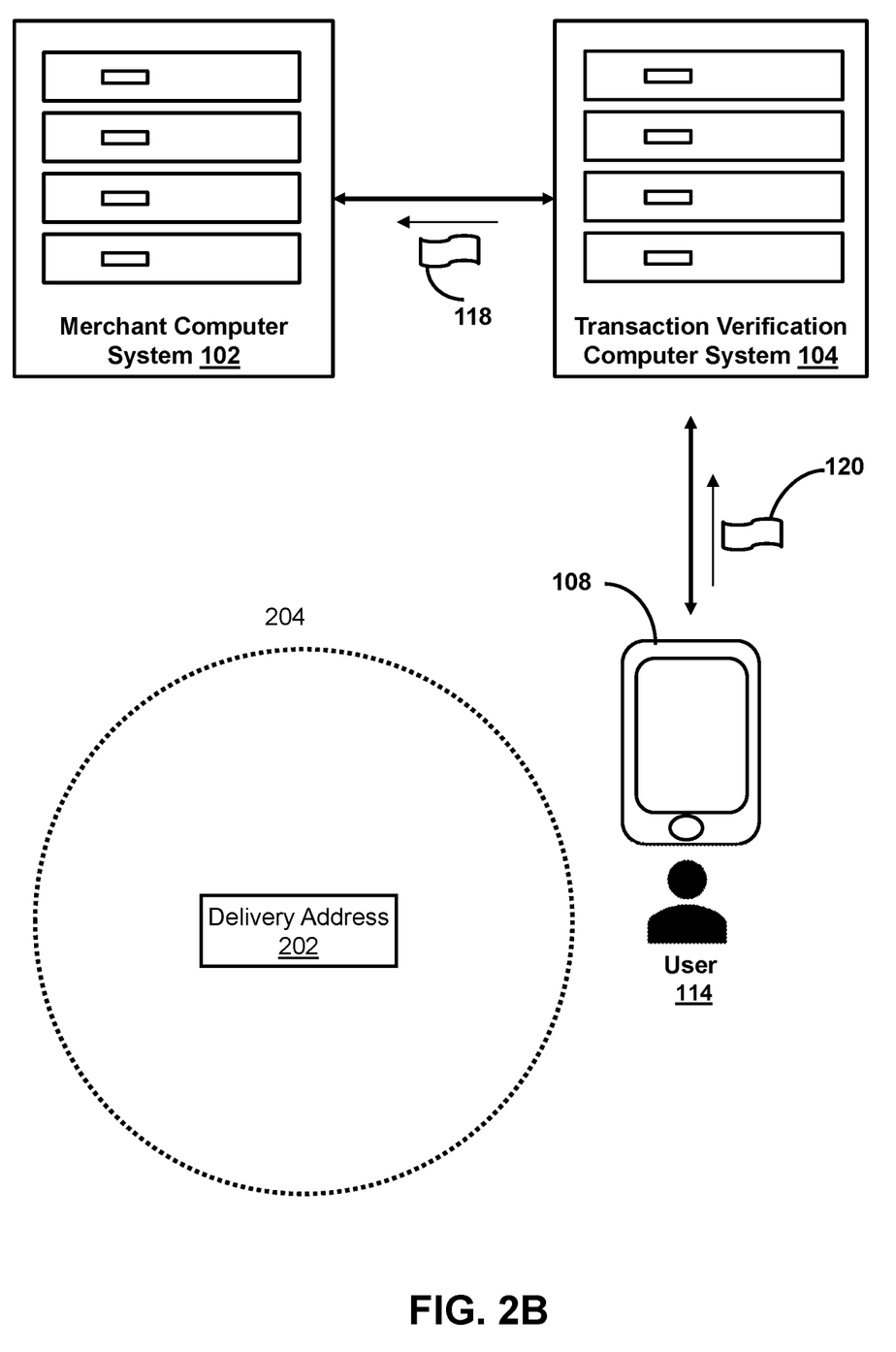
FIG. 2B shows a system configured to send a verification message indicating a transaction rejection based on proximity of a geolocation of a user to a delivery address, in accordance with one or more embodiments.

After obtaining geolocation 120 of user 114, transaction verification computer system 104 may verify the transaction based on a proximity of geolocation 120 to a delivery address specified in the transaction, as illustrated in FIGS. 2A and 2B.

FIG. 2A shows a system 100 configured to send verification message 118 indicating an approval of a transaction based on proximity of a geolocation 120 of a user to a delivery address, in accordance with one or more embodiments. The transaction verification computer system 104 determines whether geolocation 120 of user 114 matches delivery address 202 or is within a specified proximity 204 to delivery address 202 provided in the transaction. In some embodiments, the specified proximity may be a user-defined threshold (e.g., 0.1-mile radius from the delivery address, or other threshold). Further, the proximity threshold may be defined by user 114 or transaction verification computer system 104. As illustrated in FIG. 2A, transaction verification computer system 104 determines that the geolocation 120 of user 114 is within the specified proximity 204, or proximity of geolocation 120 of user 114 to delivery address 202 is within a proximity threshold. Accordingly, transaction verification computer system 104 sends verification message 118 including an approval message to merchant computer system 102 causing merchant computer system 102 to approve the transaction for delivery of goods to the delivery address 202. In some embodiments, transaction verification computer system 104 may perform a pull request to obtain a plurality of geolocations of user 114 from mobile application 110 on mobile device 108, in which case transaction verification computer system 104 may use the most recent geolocation to determine the proximity to delivery address 202. As an example, the pull request may be performed continuously or periodically (e.g., every millisecond, every second, etc.) or in response to one or more automated triggers. In some embodiments, in addition to or in lieu of such pull request, mobile application 110 may perform a push request to provide one or more geolocations of user 114 on a continuous or periodic basis or in response to one or more automated triggers.

Further, in some embodiments, mobile application 110 may be configured to run in the background, obtain the current geolocation of user 114, and store the geolocation data in mobile application 110 (e.g., so that mobile application 110 has a log of one or more prior geolocations of user 114). The mobile application 110 can provide one or more of the recent geolocations to the transaction verification computer system 104 (e.g., in response to a pull request, as a push request, etc.). In this way, for example, even at a time when the GPS data cannot be obtained, mobile application 110 can provide the most recent geolocations of user 114 to the transaction verification computer system 104, which may be used to determine proximity of user 114, the rate of motion of user 114, or other information related to the user.

FIG. 2B shows a system 100 configured to send verification message 118 indicating a rejection of a transaction based on proximity of a geolocation 120 of a user to a delivery address, in accordance with one or more embodiments. The transaction verification computer system 104 determines whether geolocation 120 of user 114 matches delivery address 202 or is within a specified proximity 204 to delivery address 202. As illustrated in FIG. 2B, transaction verification computer system 104 determines that the geolocation 120 of user 114 is not within the specified proximity 204, or the proximity of geolocation 120 of user 114 to delivery address 202 exceeds a proximity threshold. Accordingly, transaction verification computer system 104 sends verification message 118 including a rejection message to merchant computer system 102 causing merchant computer system 102 to cancel/terminate the transaction and stop the delivery of goods to the delivery address 202.

In some embodiments, transaction verification computer system 104 may ask user 114 to confirm the rejection of the transaction prior to sending a rejection message to merchant computer system 102. As an example, transaction verification computer system 104 may send a notification to user 114 requesting the user to confirm the rejection of the transaction. If user 114 confirms the rejection (or if a confirmation is not received from user 114), transaction verification computer system 104 may send a verification message including the rejection message. However, if user 114 does not confirm the rejection, that is, approves the transaction, transaction verification computer system 104 may send a verification message including the approval message.

In some embodiments, transaction verification computer system 104 verifies the transaction based on a rate of motion of user 114. As an example, user 114 may not be near the delivery address but may be on the way to the delivery address, in which case transaction verification computer system 104 may use a rate of motion of user 114 to determine if user 114 will be at or proximate to the delivery address near a delivery time of the goods, as illustrated in FIG. 2C.

Figure 2C:
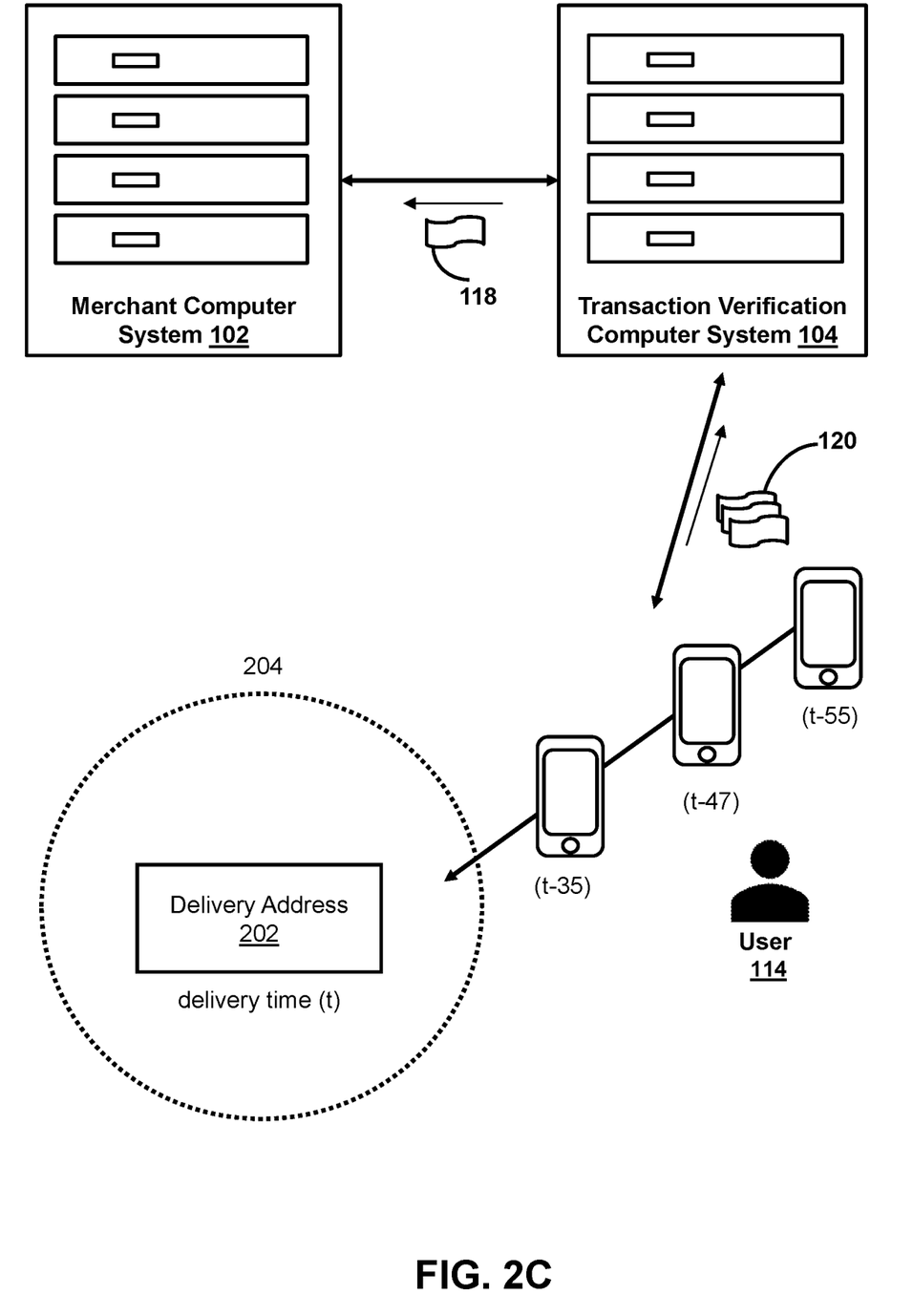
FIG. 2C shows a system configured to send a verification message indicating a transaction approval or rejection based on a rate of motion of a user, in accordance with one or more embodiments.

FIG. 2C shows a system 100 configured to send verification message 118 indicating an approval or rejection of a transaction based on a rate of motion of a user, in accordance with one or more embodiments. When user 114 is not within specified proximity 204 of delivery address 202, transaction verification computer system 104 determines if user 114 is in motion. In some embodiments, transaction verification computer system 104 may periodically perform a pull request to obtain a plurality of geolocations of user 114 from mobile application 110. The transaction verification computer system 104 may determine that the user is in motion if the geolocations obtained at (at least) two consecutive time intervals are different. In some embodiments, transaction verification computer system 104 may determine that user 114 is in motion based on sensor data (e.g., accelerometer data, GPS data, etc.) obtained from mobile device 108.

If user 114 is in motion, transaction verification computer system 104 determines a rate of motion of user 114. In some embodiments, transaction verification computer system 104 determines the rate of motion of user 114 based on the plurality of geolocations and the corresponding time intervals at which they were obtained from mobile device 108. As an example, if the geolocation is fetched every 3 minutes and the geolocation indicates that user 114 is moving 3 miles every 3 minutes, then the rate of motion is determined as 60 mph. The transaction verification computer system 104 determines based on the rate of motion and the geolocation whether user 114 will be within a specified proximity 204 of delivery address 202 near a delivery time, t. In some embodiments, the transaction verification computer system 104 may also consider the direction of travel in determining whether user 114 will be within specified proximity 204 near the delivery time. If user 114 is traveling in a direction away from delivery address 202, then the transaction verification computer system 104 may determine user 115 will not be within the specified proximity 204 near the delivery time. The transaction verification computer system 104 may have to fetch the geolocation of user 114 at different times (e.g., t-55 minutes, t-47 minutes, and t-35 minutes) to determine if user 114 is traveling away from (e.g., distance from current position of user 114 to delivery address is not decreasing) or towards (e.g., distance from user 114 to delivery address is decreasing) delivery address 202. Further, in some embodiments, user 114 may not able to drive directly to delivery address 202 (e.g., user 114 may have to use roads that take user 114 in a direction away from the delivery address for a specified distance or duration and then towards the delivery address), so a distance of a current position of user 114 to delivery address 202 can increase (e.g., for a short period), but user 114 may still be on the way to delivery address 202. Accordingly, in some embodiments, transaction verification computer system 104 may use a mapping service (e.g., a computer system that provides street maps, real-time traffic conditions, speed limit information, and route planning for traveling) to determine if a current route of user 114 will lead user 114 to delivery address 202. Based on the mapping service, transaction verification computer system 104 may calculate not just current speed of user 114, but expected speed, different possible routes to delivery address 202, or an estimated time of arrival (ETA) of user 114 to delivery address 202.

FIG. 2C shows that transaction verification computer system 104 has determined that user 114 is approaching towards the delivery address 202 based on geolocation fetched at time (t-55 minutes), (t-47 minutes), and (t-35 minutes). If the transaction verification computer system 104 determines that geolocation of user 114 will be within specified proximity 204 of delivery address 202 near the delivery time, t, then transaction verification computer system 104 sends verification message 118 including an approval message to merchant computer system 102. On the other hand, if the transaction verification computer system 104 determines that geolocation of user 114 will not be within specified proximity 204 of delivery address 202 near the delivery time, t, then transaction verification computer system 104 sends verification message 118 including a rejection message to merchant computer system 102. As described above, in some embodiments, transaction verification computer system 104 may ask user 114 to confirm the rejection of the transaction prior to sending a rejection message to merchant computer system 102.

As an example, the term "near" in "near a delivery time, t" may specify a time window before or after time, t (e.g., 5 minutes after or before t, or other threshold). As an example, user 114 is considered to be in specified proximity 204 near delivery time, t, if user 114 is in specified proximity 204 within 5 minutes before or after time, t. In some embodiments, the time window may be user-defined.

In some embodiments, transaction verification computer system 104 may verify the transaction using parameters other than geolocation 120 of user 114. For example, transaction verification computer system 104 may use parameters such as delivery address, and contact information on file with the transaction verifying entity, such as one or more addresses, telephone number, or email ID of user 114. Users may have their goods shipped to a locker (e.g., locker associated with a merchant) near a specified address (e.g., home or office). Accordingly, in some embodiments, transaction verification computer system 104 may verify the transaction by determining whether the delivery address (e.g., address of the locker to which the goods are being shipped) is within a specified proximity of one or more addresses of user 114 associated with the transaction verifying entity (e.g., one or more addresses stored with the transaction verifying entity in a user profile of user 114). If the delivery address is within the specified proximity 204 of the one or more addresses, the transaction verification computer system 104 may send a verification message including an approval message. However, if the delivery address is not within the specified proximity 204 of the one or more addresses, the transaction verification computer system 104 may send a verification message including a rejection message. As described above, in some embodiments, transaction verification computer system 104 may ask user 114 to confirm the rejection of the transaction prior to sending a rejection message to merchant computer system 102.

In some embodiments, merchants may send a code to a user, which is used to access (e.g., open) the locker. The code may be sent to the user in various modes, such as email or text message. The transaction verification computer system 104 may verify the email ID or telephone number of user 114 in addition to the delivery address to verify the transaction. As an example, the merchant computer system 102 may send the email ID or telephone number of user 114 to transaction verification computer system 104 as part of verification request 116. The transaction verification computer system 104 may verify the email ID or telephone number of user 114 received from merchant computer system 102 with the email ID or phone number of user 114 stored in a user profile with the transaction verifying entity to verify the transaction. Accordingly, the transaction verification computer system 104 may send a verification message including an approval message based on determining the delivery address is within the specified proximity 204 of the one or more known addresses, and the email ID or phone number matches the known email ID or phone number. However, if the delivery address is not within the specified proximity 204 of the one or more addresses, or the email ID or phone number does match the known email ID or phone number, the transaction verification computer system 104 may send a verification message including a rejection message.

The merchant-independent geolocation-based transaction verification method disclosed above may have various advantages. One of the advantages may include detection of a fraudulent transaction (e.g., a transaction made by a user using payment information, such as a credit card, of another user). For example, user 112 different from user 114 may initiate a transaction with merchant computer system 102 using payment information of user 114 for delivery goods at delivery address not associated with user 114. The foregoing merchant-independent geolocation-based transaction verification method may determine the geolocation of user 114 from mobile device 108 of user 114 (e.g., obtained from a mobile app associated with a transaction verifying entity such as a bank), and determine the transaction as fraudulent based on the geolocation of user 114 indicating that user 114 is not within a specified proximity of a delivery address. Additionally, in some embodiments, a merchant-independent geolocation-based transaction verification may provide an additional layer of security, as compared to techniques that rely solely on a merchant application-provided geolocation to confirm a user's location. For example, where an unauthorized user placing the order is near the delivery address, the geolocation provided by the merchant application on a mobile device of the unauthorized user may match the delivery address, and the transaction may not be identified as fraudulent. By obtaining the geolocation from a mobile app associated with the transaction verifying entity (e.g., a mobile app associated with a bank related to the user associated with the payment information), the transaction verifying entity can rely on geolocation information independent of the merchant application to confirm whether an authorized user is or will be proximate the delivery address.

Further, while the foregoing paragraphs describe obtaining geolocation of user 114 associated with the payment information in the transaction, in some embodiments, geolocation of a second user associated with the user 114 may be obtained alternatively or in addition to geolocation of user 114. The second user may be a user associated with user 114 in mobile application 110 (e.g., a spouse of user 114). As an example, the second user may be a joint account holder in bank or an add-on credit card holder in the credit card account of user 114. The transaction verification computer system 104 may determine the proximity of the geolocation of the second user (instead of, or in addition to, user 114) to the delivery address to verify the transaction. In some embodiments, the user 114 may also be able to designate which mobile device (or devices) the geolocation data should be obtained from for the purposes of such transaction verifications.

Example Flowcharts

Figure 3:
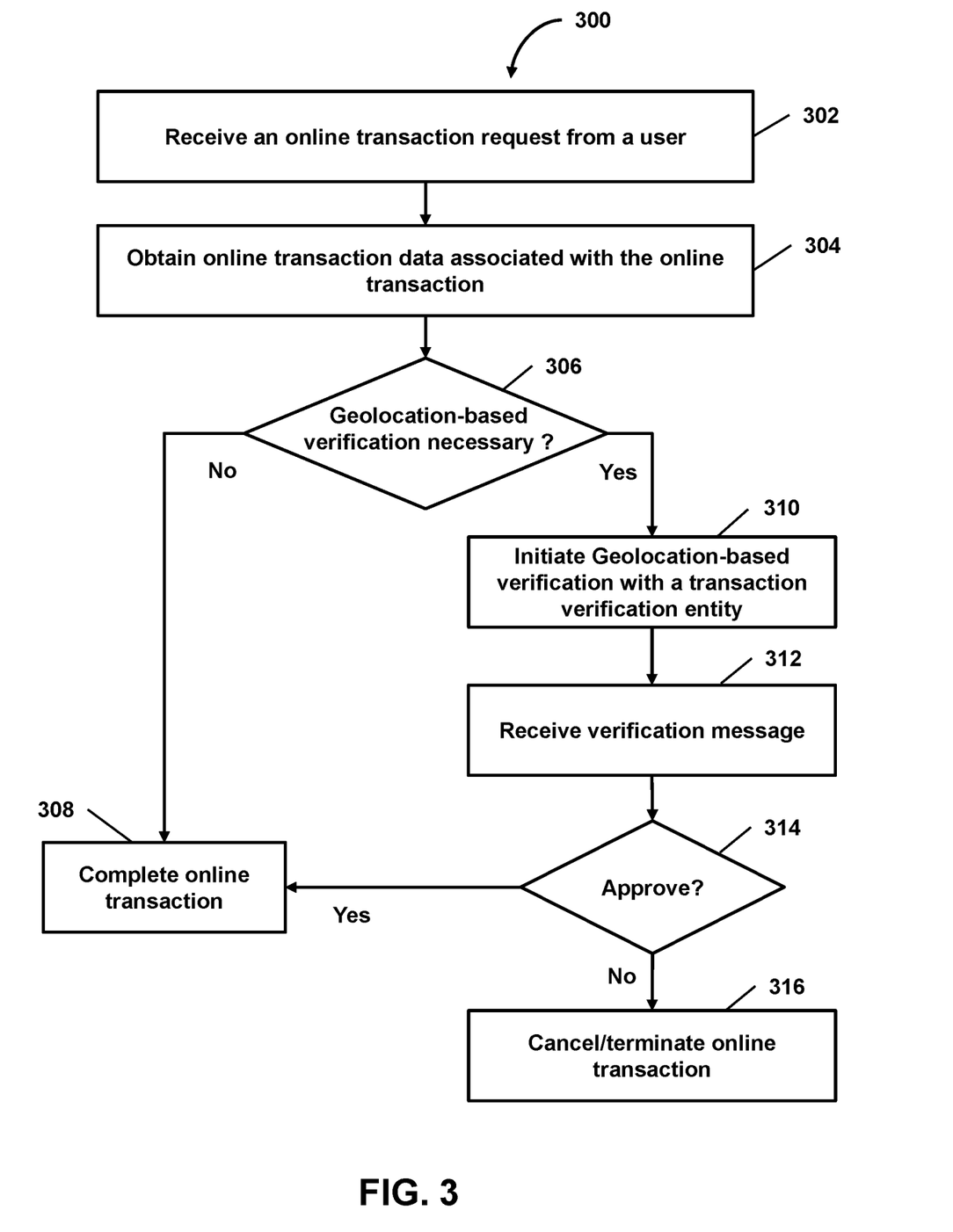
FIG. 3 shows a flowchart of a method for facilitating an online transaction with geolocation-based transaction verification, in accordance with one or more embodiments.
Figure 4:
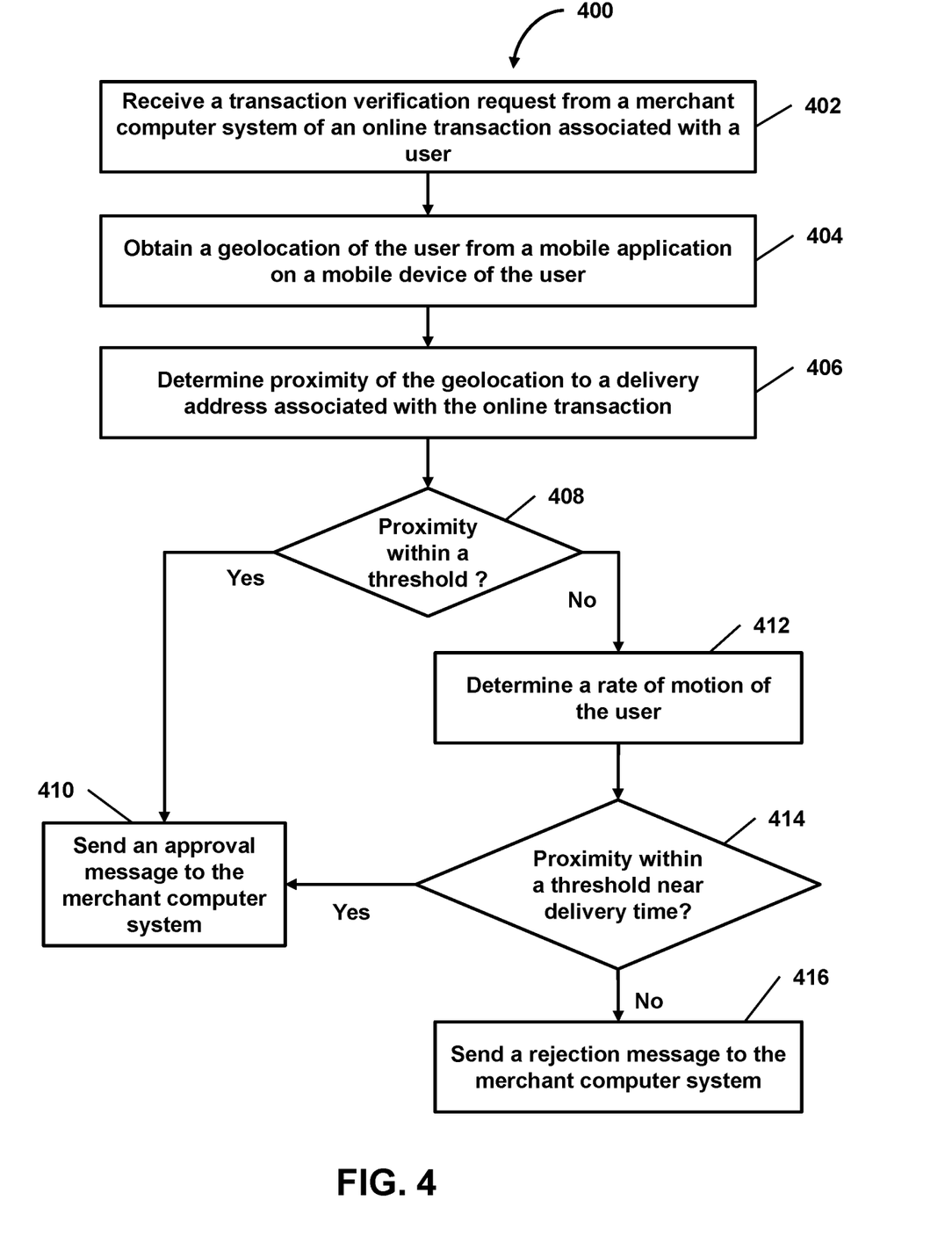
FIG. 4 shows a flowchart of a method for facilitating geolocation-based transaction verification, in accordance with one or more embodiments.

FIGS. 3 and 4 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 shows a flowchart of a method 300 for facilitating a transaction with geolocation-based transaction verification, in accordance with one or more embodiments. In an operation 302, a request for initiating a transaction is received from a user. As an example, user 112 may use a mobile application associated with merchant entity in user device 106 to initiate the transaction. As another example, user 112 may access a web site associated with the merchant entity for initiating the transaction.

In an operation 304, data associated with the transaction is obtained. As an example, transaction data may include information such as a name of user 112 initiating the transaction, telephone number or email ID of user 112, delivery address for delivering goods, delivery time, payment information associated with user 114, transaction amount, or other information. In some embodiments, the payment information may include credit card information, debit card information, bank account information, billing address, or other types of payment information associated with user 114. It should be noted that user 112 and user 114 may be the same user or different users.

In an operation 306, a determination is made whether geolocation-based verification of the transaction is necessary. In some embodiments, the transaction data may be used to determine if the criteria for geolocation-based verification of the transaction is satisfied. As an example, the criteria may include billing address being different from the delivery address. As another example, the criteria may include the transaction amount exceed a specified threshold. As another example, the criteria may include the delivery address not matching any of the addresses associated with the user (e.g., addresses on file with the merchant entity, addresses on file with the transaction verifying entity, addresses to which goods were shipped previously). As another example, the criteria may include a locker chosen for delivery is not within a specified proximity of any of the addresses associated with the user that are on file with the merchant entity. In some embodiments, the criteria may be user-defined (e.g., by the merchant entity).

In the operation 306, if a determination is made that the geolocation-based transaction verification is not necessary, in an operation 308, the transaction is completed/approved for delivery of goods at the delivery address.

In the operation 306, if a determination is made that the geolocation-based transaction verification is necessary, in an operation 310, geolocation-based transaction verification is initiated with a transaction verifying entity. The transaction verifying entity is separate and independent from the merchant entity. As an example, the transaction verifying entity may be a financial institution such as a bank associated with a user. A transaction verification computer system 104 associated with the transaction verifying entity performs the geolocation-based transaction verification, as described at least with reference to FIG. 4 below.

In operation 312, a transaction verification message is received as a result of the geolocation-based transaction verification initiated in operation 310. As an example, the transaction verification message may be received from transaction verification computer system 104, and may include an approval message for approving the transaction or a rejection message for rejecting the transaction, as described at least with reference to FIG. 4 below.

In an operation 314, a determination is made to approve or reject the transaction based on the verification message received in the operation 312. In the operation 314, if a determination is made that the verification message includes an approval message, in the operation 308, the transaction is completed/approved for delivery of goods at the delivery address.

In the operation 314, if a determination is made that the verification message includes a rejection message, in an operation 316, the transaction is terminated canceling the delivery of goods at the delivery address. As described above, in some embodiments, user 114 may be prompted to confirm the rejection of the transaction prior to the transaction being rejected.

Operations 302-314 may be performed by a system that is the same as or similar to merchant computer system 102, in accordance with one or more embodiments.

FIG. 4 shows a flowchart of a method 400 for facilitating geolocation-based transaction verification, in accordance with one or more embodiments. In some embodiments, method 400 may be performed as part of operations 310 and 312 of method 300 of FIG. 3.

In an operation 402, a verification request for a transaction is received from merchant computer system 102. In some embodiments, the verification request may include transaction data such as payment information, delivery address, delivery time, user telephone number, user email ID, or other such information.

In an operation 404, a geolocation of user associated with the payment information (e.g., user 114) is obtained. In some embodiments, geolocation is the identification or estimation of the real-world geographic location of an object, such as a radar source, mobile phone (e.g., mobile device 108), or Internet-connected computer terminal. The geolocation may be obtained from a mobile device associated with user 114. As an example, the geolocation may be obtained from the mobile application associated with the transaction verifying entity in the mobile device. As an example, the mobile application may be an "app" associated with a bank (e.g., bank provided in the payment information).

In an operation 406, a determination is made whether the geolocation of the user matches the delivery address or is within a specified proximity to the delivery address. In some embodiments, the proximity threshold may be a user-defined threshold (e.g., 0.1-mile radius from the delivery address, or other threshold). In some embodiments, the geolocation of user 114 may be obtained periodically, in which case the most recent geolocation is used to determine the proximity to the delivery address.

In the operation 408, if a determination is made that the proximity of the geolocation to the delivery address is within a threshold, in an operation 410, a verification message including an approval message for approving the transaction for delivery of goods at the delivery address is sent to the merchant server.

In the operation 408, if a determination is made that the proximity of the geolocation to the delivery address exceeds the threshold, in an operation 412, a rate of motion of user 114 is determined. In some embodiments, the rate of motion is determined based on the plurality of geolocations and the corresponding time intervals at which they were obtained from mobile device 108. As an example, if the geolocation is fetched every 3 minutes and the geolocation indicates that user 114 is moving 3 miles every 3 minutes, then the rate of motion is determined as 60 mph. As another example, the rate of motion may be obtained from sensor data (e.g., accelerometer data) of the mobile device of user 114.

In an operation 414, a determination is made whether user 114 will be within a specified proximity of the delivery address near a delivery time, t, based on the rate of motion and the geolocation of the user.

If a determination is made that that the proximity of geolocation of user 114 to the delivery address will be within a threshold near the delivery time, t, then, in an operation 410, a verification message including an approval message for delivering the goods at the delivery address is sent to the merchant server.

If a determination is made that that the proximity of geolocation of user 114 to the delivery address will not be within a threshold near the delivery time, t, then, in an operation 416, a verification message including a rejection message for stopping the delivery of goods at the delivery address is sent to the merchant server. As described above, in some embodiments, user 114 may prompted to confirm the rejection of the transaction prior to a rejection message being sent to the merchant server. As an example, a notification may be sent to user 114 requesting user 114 to confirm the rejection of the transaction. If user 114 confirms the rejection (or if a confirmation is not received from user 114), a verification message including the rejection message may be sent to the merchant server. However, if user 114 does not confirm the rejection, that is, approves the transaction, a verification message including the approval message is sent to the merchant server.

Operations 402-416 may be performed by a subsystem that is the same as or similar to transaction verification computer system 104, in accordance with one or more embodiments.

In some embodiments, the various computers and systems illustrated in FIG. 1 may include one or more computing devices that are programmed to perform the functions described herein. The computing devices may include one or more electronic storages, one or more physical processors programmed with one or more computer program instructions, and/or other components. The computing devices may include communication lines or ports to enable the exchange of information within a network or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of servers 102 and 104 or other subsystems. The processors may be programmed to execute computer program instructions by software; hardware; firmware; some combination of software, hardware, or firmware; and/or other mechanisms for configuring processing capabilities on the processors.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

The present techniques will be better understood with reference to the following enumerated embodiments:

1. A method comprising: obtaining geolocation of a user associated with a transaction from a user application on a user device associated with the user (or other software component on the user device), wherein the user application is different from a merchant application from which the transaction is initiated; determining, based on the obtained geolocation data, a proximity of the geolocation of the user to a delivery address associated with the transaction; and generating a verification message based on the determined proximity.

2. The method of embodiment 1, wherein the user application is associated with a transaction verifying entity different and independent from a merchant entity with which the merchant application is associated.

3. The method of embodiment 1-2 further comprising: sending the verification message to a merchant computer system associated with the merchant entity.

4. The method of any of embodiments 1-3, wherein generating the verification message includes sending an approval message, based on the proximity of the geolocation of the user to the delivery address being within a first threshold, causing the merchant computer system to complete the transaction to perform a delivery at the delivery address.

5. The method of any of embodiments 1-4, wherein generating the verification message includes sending a rejection message, based on the proximity of the geolocation of the user to the delivery address not being within a first threshold, causing the merchant computer system to terminate the transaction for stopping the delivery to the delivery address.

6. The method of any of embodiments 1-5, wherein determining proximity of the geolocation of the user includes obtaining a plurality of geolocations of the user from the user device and using the most recent geolocation to determine the proximity of the geolocation of the user to the delivery address.

7. The method of any of embodiments 1-6, wherein determining proximity of the geolocation of the user includes determining a rate of motion of the user based on the plurality of geolocations.

8. The method of embodiment 7, wherein generating the verification message includes sending an approval message based on the rate of motion indicating the proximity of the geolocation of the user to the delivery address will be within a first threshold near a delivery time.

9. The method of any of embodiments 7-8, wherein generating the verification message includes sending a rejection message based on the rate of motion indicating the proximity of the geolocation of the user to the delivery address will not be within a first threshold near a delivery time.

10. The method of any of embodiments 5-9, wherein sending the rejections message includes sending a notification to the user to confirm the transaction for the delivery of goods at the delivery address, and receiving a confirmation from the user to reject the transaction.

11. The method of any of embodiments 7-9, wherein the rate of motion is obtained from one or more sensors on the user device.

12. The method of embodiment 1-11, wherein obtaining the geolocation of the user includes obtaining a geolocation of another user associated with the user in the user application.

13. The method of any of embodiments 2-12, wherein obtaining the geolocation of the user includes determining the geolocation based on the delivery address not matching one or more addresses of the user associated with the transaction verifying entity.

14. The method of embodiment 1-13, wherein generating the verification message includes sending an approval message based on determining a proximity of the delivery address and one or more addresses of the user associated with the transaction verifying entity is within a first threshold.

15. The method of any of embodiments 1-14, wherein the transaction is initiated from a device different from the user device.

16. The method of any of embodiments 14-15, wherein the device is associated with a second user different from the user.

17. A tangible, non-transitory, machine-readable medium storing instructions that, when executed by a data processing apparatus, cause the data processing apparatus to perform operations comprising those of any of embodiments 1-16.

18. A system comprising: one or more processors; and memory storing instructions that, when executed by the processors, cause the processors to effectuate operations comprising those of any of embodiments 1-16.

What is claimed is:

1. A system for facilitating verification of an online transaction via merchant-independent user geolocation, the system comprising:
a transaction verification computer system associated with a transaction verifying entity, the transaction verification computer system comprising one or more processors programmed with computer program instructions that, when executed, cause the transaction verification computer system to:
receive, from a merchant computer system, a verification request associated with a user for an online transaction initiated via a merchant application on a client device of the user, the merchant computer system being (i) associated with a merchant entity different from the transaction verifying entity and (ii) separate and independent from the transaction verification computer system;
in response to the verification request, periodically perform a pull request to obtain a plurality of geolocations of the user from a mobile application on a mobile device of the user, the mobile application being different from the merchant application, the mobile device being different from the client device via which the online transaction is initiated;
determine a rate of motion of the user based on the plurality of geolocations of the user;
generate a verification message related to the online transaction based on (i) the rate of motion and (ii) proximity of a most recent geolocation of the plurality of geolocations to a delivery address associated with the online transaction; and
provide the verification message to the merchant computer system.

2. The system of claim 1, wherein the transaction verification computer system is caused to:
send the verification message including an approval message to perform a delivery at the delivery address based on the proximity of the most recent geolocation of the user to the delivery address being within a first threshold.

3. The system of claim 1, wherein the transaction verification computer system is caused to:
send the verification message including an approval message to perform a delivery at the delivery address based on the rate of motion indicating the proximity of the geolocation of the user to the delivery address will be within a first threshold near a delivery time.

4. A method implemented on a transaction verification computer system associated with a transaction verifying entity, the transaction verification computer system comprising one or more processors executing computer program instructions that, when executed, perform the method, the method comprising:

receiving, from a merchant computer system, a verification request associated with a user for an online transaction initiated via a merchant application on a client device, the merchant computer system being separate from the transaction verification computer system;

obtaining a geolocation of the user from a mobile application on a mobile device of the user, the mobile application being different from the merchant application;

determining that proximity of the geolocation or an address of the user associated with the transaction verifying entity to a delivery address associated with the online transaction is within a first threshold;

generating a verification message related to the online transaction based on the proximity of the geolocation or the address of the user to the delivery address being within the first threshold, the verification message comprising an approval message; and providing the verification message to the merchant computer system, the approval message of the verification message causing the merchant computer system to complete the online transaction for performing a delivery at the delivery address.

5. The method of claim 4, wherein determining the proximity of the geolocation to the delivery address includes determining the proximity of a most recent geolocation of the user to the delivery address.

6. The method of claim 4, wherein providing the verification message includes sending an approval message based on the proximity of the geolocation of the user to the delivery address being within a first threshold, the approval message causing the merchant computer system to complete the online transaction to perform a delivery at the delivery address.

7. The method of claim 4, wherein generating the verification message further includes generating the verification message based on a rate of motion of the user.

8. The method of claim 7, wherein providing the verification message includes:

obtaining a plurality of geolocations of the user obtained from the mobile application, sending an approval message based on:
the plurality of geolocations indicating that the user is moving towards the delivery address, and
the rate of motion indicating the proximity of the geolocation of the user to the delivery address will be within a first threshold near a delivery time, wherein the approval message causes the merchant computer system to complete the online transaction to perform a delivery at the delivery address.

9. The method of claim 7, wherein providing the verification message includes sending a rejection message based on the rate of motion indicating that the proximity of the geolocation of the user to the delivery address will not be within a first threshold near a delivery time, the rejection message causing the merchant computer system to terminate the online transaction for stopping the delivery to the delivery address.

10. The method of claim 7, wherein the rate of motion is obtained from one or more sensors on the mobile device.

11. The method of claim 4, wherein providing the verification message includes sending a rejection message based on the proximity of the geolocation of the user to the delivery address exceeding a first threshold, the rejection message causing the merchant computer system to terminate the online transaction for stopping a delivery at the delivery address.

12. The method of claim 11, wherein sending the rejection message includes:

sending a notification to the user to confirm the online transaction for the delivery of goods at the delivery address, and receiving a confirmation from the user to reject the online transaction.

13. The method of claim 4, wherein obtaining the geolocation of the user includes determining a geolocation of another user associated with the user in the mobile application.

14. The method of claim 4, wherein obtaining the geolocation of the user includes:

determining the geolocation based on the delivery address not matching one or more addresses of the user associated with the transaction verifying entity.

15. The method of claim 4, wherein providing the verification message includes:

determining a proximity of the delivery address and one or more addresses of the user associated with the transaction verifying entity is within a first threshold, and sending an approval message causing the merchant computer system to complete the online transaction for performing a delivery at the delivery address.

16. The method of claim 4, wherein the client device is associated with a second user different from the user.

17. A non-transitory computer-readable medium storing instructions that, when executed by one or more processors, cause operations to be implemented on a transaction verification computer system, the operations comprising:

receiving from a merchant computer system, a verification request associated with a user for an online transaction initiated via a merchant application, the merchant computer system being separate from the transaction verification computer system;

obtaining a geolocation of the user from a user application of the user, the user application being different from the merchant application;

determining that proximity of the geolocation or an address of the user associated with the transaction verifying entity to a delivery address associated with the online transaction is within a first threshold;

generating a verification message related to the online transaction based on the proximity of the geolocation or the address of the user to the delivery address being within the first threshold, the verification message comprising an approval message; and providing the verification message to the merchant computer system, the approval message of the verification message causing the merchant computer system to complete the online transaction for performing a delivery at the delivery address.

18. The computer-readable medium of claim 17, wherein the user application is a mobile application associated with the transaction verification computer system, the user application installed on a mobile device associated with the user.

19. The computer-readable medium of claim 17, wherein providing the verification message includes sending an approval message based on the proximity of the geolocation of the user to the delivery address being within a first threshold, the approval message causing the merchant computer system to complete the online transaction for performing a delivery at the delivery address.

20. The computer-readable medium of claim 17, wherein providing the verification message includes:
   obtaining a plurality of geolocations of the user from the user application,
   obtaining a rate of motion of the user from the user application,
   sending an approval message based on:
      the plurality of geolocations indicating the user is moving towards the delivery address, and
      the rate of motion indicating the proximity of the geolocation of the user to the delivery address will be within a first threshold near a delivery time, the approval message causing the merchant computer system to complete the online transaction for performing a delivery at the delivery address.

\* \* \* \* \*